United States Patent
Deng et al.

(10) Patent No.: US 8,928,833 B2
(45) Date of Patent: Jan. 6, 2015

(54) BACKLIGHT MODULE AND LCD DEVICE

(75) Inventors: Mingfeng Deng, Shenzhen (CN);
Jungmao Tsai, Shenzhen (CN);
Songxian Wen, Shenzhen (CN);
Yizhuang Zhuang, Shenzhen (CN); Hui Zhou, Shenzhen (CN); Jingming Wu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 462 days.

(21) Appl. No.: 13/376,657

(22) PCT Filed: Dec. 4, 2011

(86) PCT No.: PCT/CN2011/083429
§ 371 (c)(1),
(2), (4) Date: Dec. 7, 2011

(87) PCT Pub. No.: WO2013/078696
PCT Pub. Date: Jun. 6, 2013

(65) Prior Publication Data
US 2013/0135559 A1 May 30, 2013

(30) Foreign Application Priority Data
Nov. 29, 2011 (CN) .......................... 2011 1 0386674

(51) Int. Cl.
*G02F 1/1333* (2006.01)

(52) U.S. Cl.
USPC .............................................. 349/58; 349/65

(58) Field of Classification Search
USPC ...................................................... 349/58, 65
See application file for complete search history.

(56) References Cited

U.S. PATENT DOCUMENTS

2002/0044437 A1* 4/2002 Lee ................................. 362/31
2011/0069509 A1* 3/2011 Lin et al. ....................... 362/607

FOREIGN PATENT DOCUMENTS

| CN | 1372160 A | 10/2002 |
| CN | 1461965 A | 12/2003 |

(Continued)

OTHER PUBLICATIONS

Hu Yang, The International Searching Authority written comments, Oct. 2012, CN.

(Continued)

*Primary Examiner* — Lucy Chien
(74) *Attorney, Agent, or Firm* — IPro, Inc.; Na Xu

(57) ABSTRACT

The present invention discloses a backlight module and an LCD device, comprising: a backplane and an LGP; the edge(s) of the LGP is provided with lug boss(es), each lug boss is provided with a positioning hole, and the backplane is provided with rivet(s) for matching with the positioning hole; a buffer structure is arranged between the rivet and the wall of the positioning hole. In the present invention, because the edge(s) of the LGP is provided with lug boss(es), each lug boss is provided with a positioning hole, the arrangement of the positioning hole does not influence the light guide area of the LGP; meanwhile, because a layer of buffer structure is arranged between the positioning hole and the rivet, the rupture of the part with concentrated stress in the positioning hole during collision is avoided. In addition, when the LGP is expanded with heat, the buffer structure can also avoid the extrusion damage caused by direct extrusion between the LGP and the rivet; when the LGP is contracted with cold, the gap between the LGP and the rivet is increased so that shake is easily caused. The gap between the LGP and the rivet is automatically filled by a buffer part through the elastic regulation of the buffer part. Thus, the shake collision of the LGP is avoided.

22 Claims, 5 Drawing Sheets

(56) References Cited

FOREIGN PATENT DOCUMENTS

| | | |
|---|---|---|
| CN | 1677186 A | 10/2005 |
| CN | 100373228 C | 3/2008 |
| CN | 201094116 Y | 7/2008 |
| CN | 201106655 Y | 8/2008 |
| CN | 201130286 Y | 10/2008 |
| CN | 101363470 A | 2/2009 |
| CN | 101725924 A | 6/2010 |
| CN | 102322600 A | 1/2012 |
| JP | 2001021389 A | 1/2001 |
| KR | 2009012891 U | 12/2009 |

OTHER PUBLICATIONS

Zhang Yue, The first office action, Apr. 2013, CN.

\* cited by examiner

BACKLIGHT MODULE AND LCD DEVICE

TECHNICAL FIELD

The present invention relates to the field of liquid crystal displays (LCDs), and more particularly to a backlight module and an LCD device.

BACKGROUND

Thin film transistor liquid crystal display (TFT LCD) has already become a crucial display platform of modern IT and video products. The main operating principle of the TFT LCD: appropriate voltage is applied between the liquid crystal layers of an array glass substrate and a color filter (CF) glass substrate, so that liquid crystal molecules are deflected under the action of the voltage, and different penetration rates are obtained by the control of different voltages. Thus, display is achieved. Because an LCD can not emit light by itself, a backlight source is used as a source of the light source of the LCD. The LCD backlight source at present mainly includes a (cold cathode fluorescent lamp) CCFL backlight source and a light-emitting diode (LED) backlight source in accordance with different light emitting devices. The LED backlight source is welcomed by consumers because the LED backlight source is superior to the CCFL backlight source in the aspects such as volume, color range, efficiency and the like.

FIG. 1 is a section diagram of a backlight module with an edge type LED backlight source. The backlight module includes an LCD panel 1, an optical diaphragm 2, a light guide plate (LGP), a reflection sheet 4, a backplane 5, an LED light bar 6, a radiator 7, a front frame 8, screw(s) 9 and the like.

The positioning modes of the LGP are different in accordance with different size and requirements. FIG. 2 shows a positioning mode of an LCP 3 of one size, the LGP 3 is provided with five positioning points in total, namely the positioning holes 32 shown in the figure. The five positioning holes 32 are respectively a, b, c, d, and e. The stress directions of the positioning holes 32 are shown as the arrow directions in the figure. The number (pressure) and size of the stress points of the LGP 3 are different when the LCP 3 is in different vibration directions. When the LGP 3 is in the horizontal vibration direction, the stress points may be a, b, and c or the combination of a, b, and c. FIG. 3 is a simplified structure diagram of the positioning hole 32 (a) matched with a rivet 31 on a backplane 5. The rivet 31 is inserted in the positioning hole 32, so that the LGP 3 is limited in three directions. In accordance with stress analysis, as shown in FIG. 4, obvious stress concentration is produced at the root of the positioning hole 32 (a) because of undersize R1 and R2 angles, easily causing the LGP 3 to rupture.

SUMMARY

The aim of the present invention is to provide a backlight module with high reliability.

The purpose of the present invention is achieved by the following technical schemes. A backlight module comprises an LGP and rivet(s) for fixing the LGP; the edge(s) of the LGP is provided with lug boss(es), and each lug boss is provided with a positioning hole; a buffer structure is arranged between the rivet and the wall of the positioning hole.

Preferably, the buffer structure is a buffer sleeve, and the buffer sleeve is sheathed on the rivet. The technology is simple and the production and assembly are convenient as long as the buffer sleeve is sheathed on the existing rivet.

Preferably, the rivet stem is provided with a groove; correspondingly, the buffer sleeve opening is provided with a flange which is inwards extended and is used for inserting into the groove to prevent the buffer sleeve from disconnecting by accident under the conditions of vibration, etc.

Preferably, the groove surrounds the whole surface of the rivet stem; correspondingly, the flange is a collar flange. The fixing performance is preferable because the collar flange is matched with the groove, and the assembly becomes simpler because the flange is not required to be aligned with the groove when installing the buffer sleeve.

Preferably, the buffer structure is made of wear resistance material. Friction is produced between the positioning hole of the LGP and the rivet because of vibration, while the material with preferable wear resistance can ensure the reliability of the buffer structure.

Preferably, the buffer sleeve is made of silica gel, or rubber, or foamed plastics. These materials are preferable buffer materials with the advantages of good elasticity, high wear resistance and low price.

Preferably, the buffer structure is a buffer pad attached to the wall of the positioning hole. The buffer pad attached to the wall of the positioning hole can effectively avoid the rigid collision between the positioning hole and the rivet as well.

Preferably, the buffer pad is made of elastic rubber. Rubber is a preferable buffer material.

Preferably, the filling without clearance is formed by the buffer structure between the wall of the positioning hole and the rivet. The oversize vibration of the rivet relative to the LGP is avoided occurring, and then the collision force is reduced.

Preferably, the buffer structure is manufactured by a mold, so that the buffer structure can be conveniently made into a standard part and has good generality.

Preferably, the buffer structure is formed by solidified liquid adhesive which is filled. This is a convenient manufacturing mode.

An LCD device comprises any one of the aforementioned backlight modules.

In the present invention, because the edge(s) of the LGP is provided with lug boss(es), each lug boss is provided with a positioning hole, the arrangement of the positioning hole does not influence the light guide area of the LGP. Meanwhile, a layer of buffer structure is arranged between the positioning hole and the rivet, the damage caused by high power produced because the LGP is in direct collision with the rivet during vibration is avoided, and more particularly, the rupture of the part with concentrated stress in the positioning hole during collision, which has an influence on the positioning reliability, is avoided. The buffer structure used in the present invention has the advantages of simple process, cheap material, and realization of low cost. In addition, when the LGP is expanded with heat, the buffer structure can also avoid the extrusion damage caused by direct extrusion between the LGP and the rivet; when the LGP is contracted with cold, the gap between the LGP and the rivet is increased so that shake is easily caused. The gap between the LGP and the rivet is automatically filled by a buffer part through the elastic regulation of the buffer part. Thus, the close contact between the LGP and the rivet is kept, and the shake collision of the LGP is avoided.

Wherein: 1 LCD panel. 2. optical diaphragm; 3. LGP; 4. reflection sheet; 5. backplane; 6. LED light bar; 7. radiator; 8. front frame; 9. screw; 31. rivet; 32. positioning hole; 33. buffer structure; 34. flange; 35 groove.

DETAILED DESCRIPTION

The present invention will further be described in detail in accordance with the figures and the preferred examples.

Figure 1:
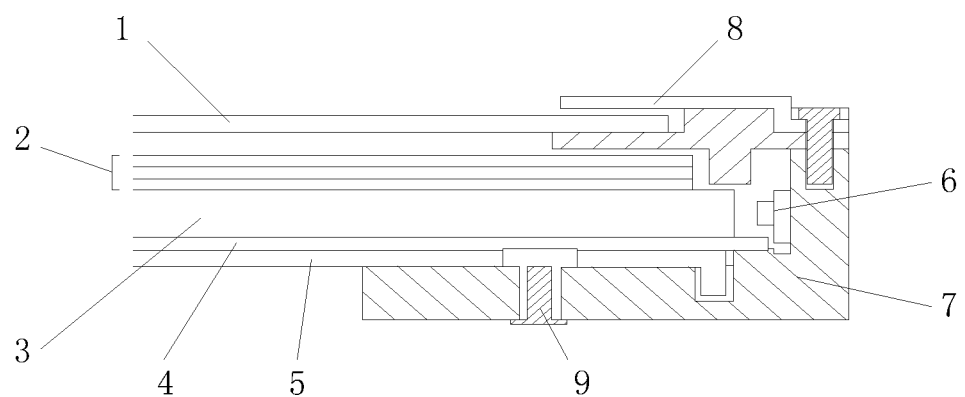
FIG. 1 is a simplified structure diagram of an existing backlight module.
Figure 2:
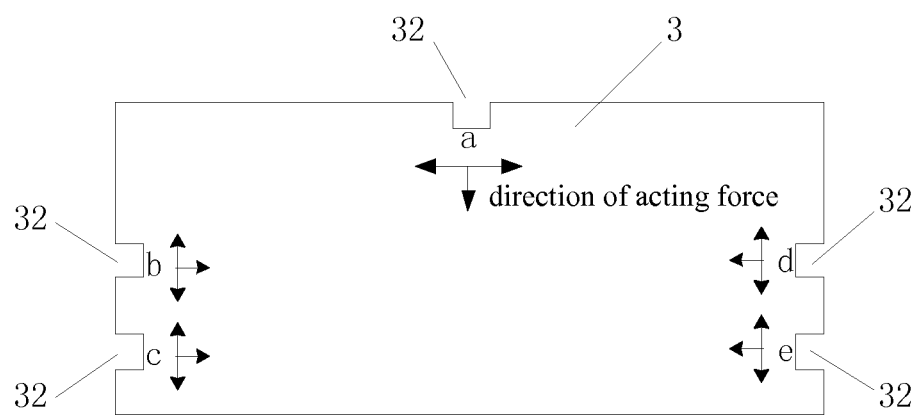
FIG. 2 is a positioning mode of an existing LGP.
Figure 3:
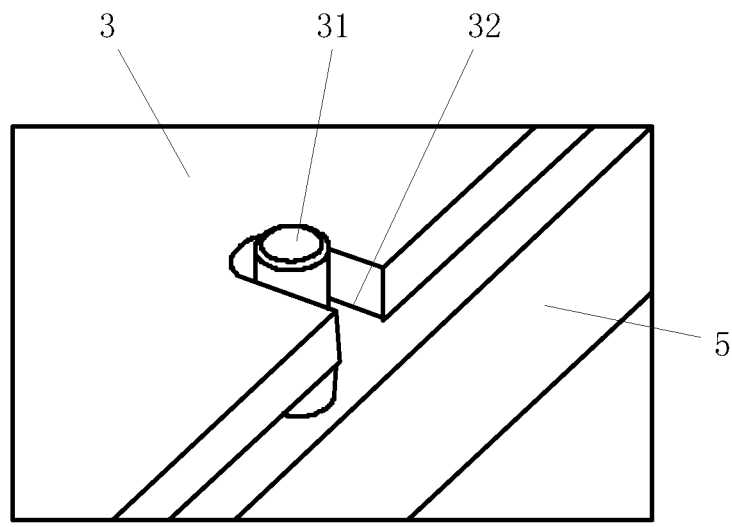
FIG. 3 is a simplified structure diagram of a positioning mode of an existing LGP.
Figure 4:
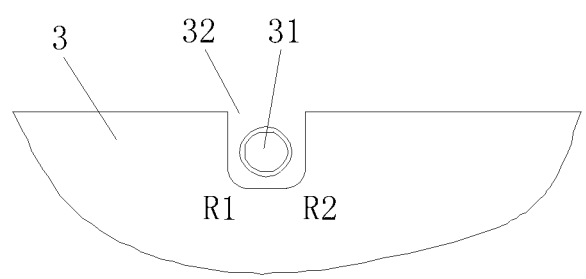
FIG. 4 is a stress analysis diagram of a positioning mode of an existing LGP.
Figure 5:
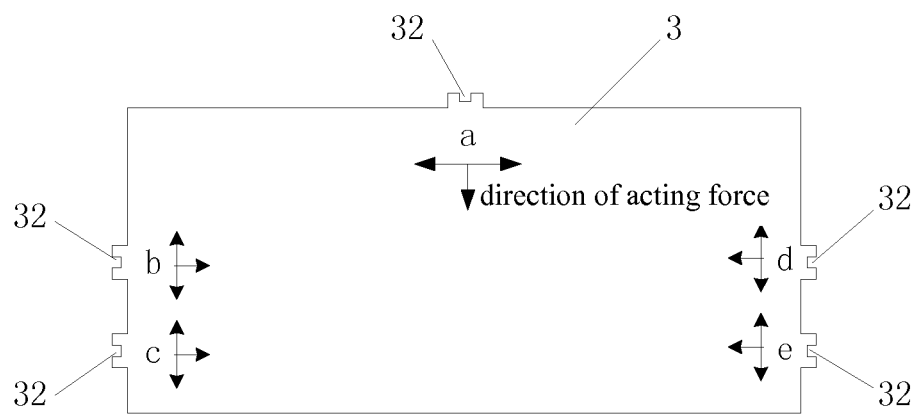
FIG. 5 is a simplified structure diagram of an LGP of a first example of the present invention.
Figure 6:
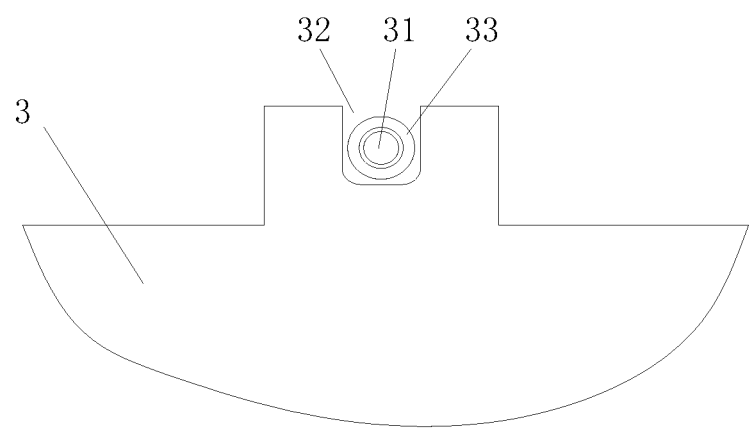
FIG. 6 is a simplified structure diagram of the first example of the present invention.
Figure 7:
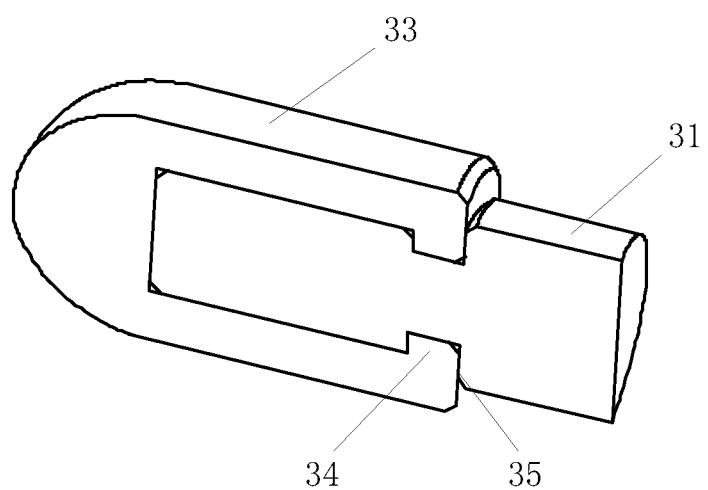
FIG. 7 is an installation structure diagram of a buffer structure and a rivet of the first example of the present invention.

The structure of a backlight module is as shown in FIG. 1. The backlight module comprises an LCD panel 1, an optical diaphragm 2, an LGP, a reflection sheet 4, a backplane 5, an LED light bar 6, a radiator 7, a front frame 8, screw(s) 9 and the like. The present invention changes the positioning structure of the LGP 3 to improve the reliability of the backlight module. FIG. 5 to FIG. 7 are simplified structure diagrams of the positioning structure of the LGP 3 in the technical scheme of the present invention.

The three examples of the present invention still use the positioning mode of clamping the LGP by rivet(s) as an example.

FIG. 5 shows an LGP 3 of the first example of the present invention. The three edges of the LGP 3 are respectively provided with lug boss, and each lug boss is provided with a positioning hole 32, and the lug bosses are arranged to prevent the arrangement of the positioning holes from influencing the light guide area of the LGP 3. As shown in FIG. 6, in the positioning structure of the LGP 3, the rivet 31 is sheathed with a rubber sleeve buffer structure 33 which is a wear-resistance rubber sleeve, the collision force is buffered and digested by the rubber sleeve buffer structure 33 when the LGP 3 is in collision with the rivet 31 under the condition of vibration, the collision force of the wall of the positioning hole 32 in the LGP 3 is greatly reduced, and the LGP is effectively protected. Suppose the acting force of the LGP 3 and the rivet 31 during vibration is fixed as F, the mass of the LGP 3 is m. Under the condition of having no rubber sleeve as a buffer structure 33, the contact area between the LGP 3 and the rivet 31 is S, and the acting time is t; when the rubber sleeve is sheathed on the rivet 31, the contact area between the LGP 3 and the rivet 31 is S1, and the acting time is t1. The contact between the LGP 3 and the rivet 31 is rigid contact under the condition of no buffer structure 33; the contact between the LGP 3 and the buffer structure 33 (i.e. rubber sleeve) on the rivet 31 is nonrigid contact under the condition of having buffer structure 33, namely S1=x*S, t1=y*t, wherein x and y are more than 1. The ratio of the LGP 3 bearing pressure and acceleration under the condition of having no buffer structure to the LGP 3 bearing pressure and acceleration under the condition of having buffer structure is: 1/x and 1/y, namely the designed rubber sleeve can protect the LGP 3 from being damaged during vibration.

As shown in FIG. 7, in the example, the rivet 31 is sheathed with a rubber sleeve buffer structure 33, the opening of the rubber sleeve is provided with inwards extended flange(s) 34, and the rivet 31 is correspondingly provided with groove(s) 35; after the rubber sleeve is sheathed on the rivet 31, the flange 34 is inserted in the groove 35, and the rubber sleeve is tightened. The process is simple when the rubber sleeve is used as long as the rubber sleeve is sheathed on the existing rivet 31, and production and use are convenient. The groove 35 also surrounds the rivet stem surface; correspondingly, the flange 34 is also a collar flange. The fixing performance is preferable because the collar flange 34 is matched with the groove 35, and the assembly becomes simpler because the flange 34 is not required to be aligned with the groove 35 when installing the buffer sleeve.

In the example, only one positioning structure of the LGP 3 is described, the positioning structures of other positions are the same as the structure of the position.

Figure 8:
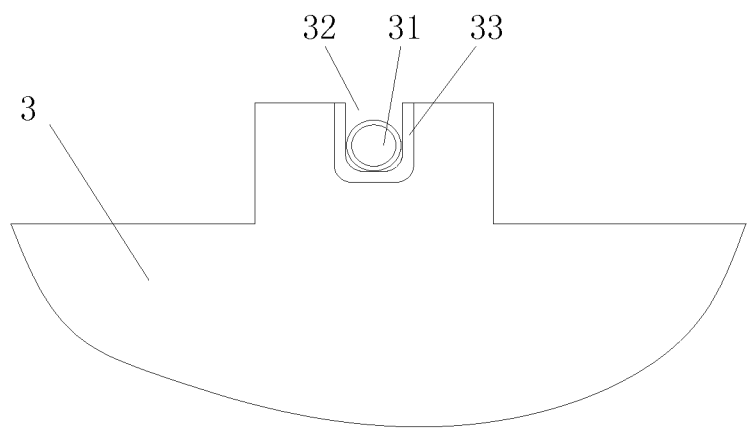
FIG. 8 is a simplified structure diagram of a second example of the present invention.

FIG. 8 shows the second example of the present invention. The second example is different from the first example in that: the buffer structure 33 can be a layer of adhesive bonded to the wall of the positioning hole 32. Correspondingly, the rubber sleeve may not be sheathed on the surface of the rivet 31; of course, the rubber sleeve can be sheathed on the surface of the rivet 31 as well.

Figure 9:
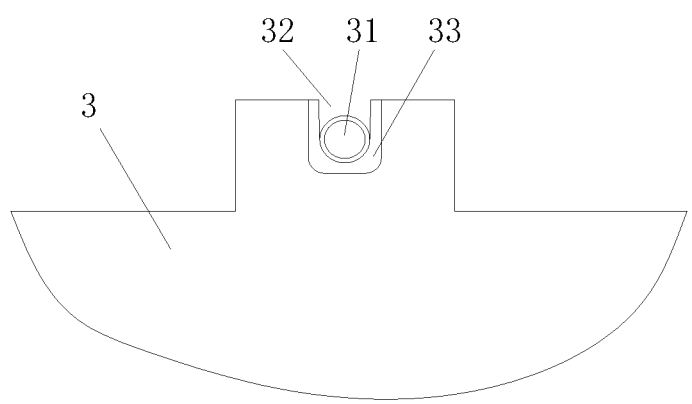
FIG. 9 is a simplified structure diagram of a third example of the present invention.

FIG. 9 shows the third example of the present invention. The third example is different from the first example in that: the rivet 31 is closely packaged by the buffer structure 33, and no clearance is left between the contact surfaces of the rivet 31 and the buffer structure 33. Thus, the rivet 31 is prevented from vibrating at oversize distance relative to the LGP 3, and then the collision force is reduced.

In the examples of the present invention, preferably, the buffer structure is made of material with good wear resistance, to ensure that the buffer structure will not be worn during vibration. Thus, the reliability of the buffer structure is guaranteed. Generally speaking, the buffer structure is made of silica gel, rubber or foamed plastics, these materials are preferable buffer materials with the advantages of good elasticity, high wear resistance and low price.

The buffer structure can be made into a standard part by a mold. Thus, the buffer structure can be produced in large batch and has generality. Of course, the buffer structure can be made in the mode of solidifying and molding the filled liquid adhesive.

The present invention is described in detail in accordance with the above contents with the specific preferred examples. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A backlight module, comprising: an LGP and rivet(s) for fixing the LGP; the outmost edge(s) of said LGP is provided with separated lug bosses each overstepping corresponding outmost edge(s), each said lug boss is provided with a positioning hole, and a buffer structure is arranged between said rivet and the wall of said positioning hole.

2. The backlight module of claim 1, wherein said buffer structure is a buffer sleeve, and said buffer sleeve is sheathed on said rivet.

3. The backlight module of claim 2, wherein said rivet stem is provided with a groove; correspondingly, the buffer sleeve opening is provided with a flange which is inwards extended and is used for inserting into said groove.

4. The backlight module of claim 1, wherein said groove surrounds the whole surface of said rivet stem; correspondingly, said flange is a collar flange.

5. The backlight module of claim 1, wherein said buffer structure is made of wear resistance material.

6. The backlight module of claim 5, wherein said buffer sleeve is made of silica gel, or rubber, or foamed plastics.

7. The backlight module of claim 1, wherein said buffer structure is a buffer pad attached to the wall of the positioning hole.

8. The backlight module of claim 7, wherein said buffer pad is made of elastic rubber.

9. The backlight module of claim 1, wherein the filling without clearance is formed by said buffer structure between the wall of said positioning hole and said rivet.

10. The backlight module of claim 1, wherein said buffer structure is manufactured by a mold.

11. The backlight module of claim 1, wherein said buffer structure is formed by solidified liquid adhesive which is filled.

12. An LCD device, comprising: the backlight module of claim 1; said backlight module comprises an LGP and rivet(s) for fixing the LGP; the edge(s) of said LGP is provided with lug boss(es), each said lug boss is provided with a positioning hole, and a buffer structure is arranged between said rivet and the wall of said positioning hole.

13. The LCD device of claim 12, wherein said buffer structure is a buffer sleeve, and said buffer sleeve is sheathed on said rivet.

14. The LCD device of claim 13, wherein said rivet stem is provided with a groove; correspondingly, the buffer sleeve opening is provided with a flange which is inwards extended and is used for inserting into said groove.

15. The LCD device of claim 14, wherein said groove surrounds the whole surface of said rivet stem; correspondingly, said flange is a collar flange.

16. The LCD device of claim 15, wherein said buffer structure is made of wear resistance material.

17. The LCD device of claim 16, wherein said buffer sleeve is made of silica gel, or rubber, or foamed plastics.

18. The LCD device of claim 17, wherein said buffer structure is a buffer pad attached to the wall of said positioning hole.

19. The LCD device of claim 18, wherein said buffer pad is made of elastic rubber.

20. the LCD device of claim 19, wherein the filling without clearance is formed by the buffer structure between the wall of the positioning hole and the rivet.

21. The LCD device of claim 20, wherein said buffer structure is manufactured by a mold.

22. The LCD device of claim 21, wherein said buffer structure is formed by solidified liquid adhesive which is filled.

* * * * *